(12) United States Patent
Walker et al.

(10) Patent No.: US 11,392,448 B2
(45) Date of Patent: Jul. 19, 2022

(54) PAYLOAD PARITY PROTECTION FOR A SYNCHRONOUS INTERFACE

(71) Applicant: Micron Technology, Inc., Boise, ID (US)

(72) Inventors: Dean E. Walker, Allen, TX (US); Tony Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 86 days.

(21) Appl. No.: 17/074,819

(22) Filed: Oct. 20, 2020

(65) Prior Publication Data

US 2022/0121514 A1 Apr. 21, 2022

(51) Int. Cl.
*G06F 11/10* (2006.01)
*G06F 13/42* (2006.01)

(52) U.S. Cl.
CPC .......... *G06F 11/10* (2013.01); *G06F 11/1004* (2013.01); *G06F 13/4282* (2013.01)

(58) Field of Classification Search
CPC ....... G11C 11/409; G11C 29/52; G06F 11/10; G06F 11/1004; G06F 11/1028; G06F 13/4283
See application file for complete search history.

(56) References Cited

U.S. PATENT DOCUMENTS

| | | |
|---|---|---|
| 2019/0042361 A1 | 2/2019 | Mcvay et al. |
| 2019/0243700 A1 | 8/2019 | Brewer |
| 2019/0294493 A1 | 9/2019 | Bradshaw |
| 2020/0136996 A1* | 4/2020 | Li .......................... H04L 49/356 |
| 2020/0183594 A1 | 6/2020 | Gyllenskog |
| 2020/0294181 A1 | 9/2020 | Matam et al. |
| 2020/0389172 A1* | 12/2020 | Dabral ................ H01L 25/0655 |
| 2022/0059455 A1* | 2/2022 | Chen ..................... G11C 11/409 |

OTHER PUBLICATIONS

"International Application Serial No. PCT US2021 053970, International Search Report dated Jan. 26, 2022", 3 pgs.
"International Application Serial No. PCT US2021 053970, Written Opinion dated Jan. 26, 2022", 5 pgs.

* cited by examiner

*Primary Examiner* — Shelly A Chase
(74) *Attorney, Agent, or Firm* — Schwegman Lundberg & Woessner, P.A.

(57) ABSTRACT

A chiplet system can include a Serial Peripheral Interface (SPI) bus for communication. A controller or primary device coupled to the SPI bus can generate a message with read or write instructions for one or more secondary devices. In an example, the primary device can be configured to read information from a secondary device about whether the secondary device supports parity-protected data communications. The primary device can be configured to selectively send or receive parity-protected data communications depending on a capability of the secondary device to support parity.

20 Claims, 10 Drawing Sheets

PAYLOAD PARITY PROTECTION FOR A SYNCHRONOUS INTERFACE

TECHNICAL FIELD

Embodiments of the disclosure relate generally to chiplet-based electronic systems and to communications in such systems.

BACKGROUND

Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property (IP) blocks) on one substrate (e.g., single die), such as a system-on-a-chip (SoC), or discretely packaged devices integrated on a board. In general, chiplets provide better performance (e.g., lower power consumption, reduced latency, etc.) than discretely packaged devices, and chiplets provide greater production benefits than single die chips. These production benefits can include higher yields or reduced development costs and time.

Chiplet systems are generally made up of one or more application chiplets and support chiplets. Here, the distinction between application and support chiplets is simply a reference to the likely design scenarios for the chiplet system. Thus, for example, a synthetic vision chiplet system can include an application chiplet to produce the synthetic vision output along with support chiplets, such as a memory controller chiplet, sensor interface chiplet, or communication chiplet. In a typical use case, the synthetic vision designer can design the application chiplet and source the support chiplets from other parties. Thus, the design expenditure (e.g., in terms of time or complexity) is reduced by avoiding the design and production of functionality embodied in the support chiplets. Chiplets also support the tight integration of IP blocks that can otherwise be difficult, such as those using different feature sizes. Thus, for example, devices designed during a previous fabrication generation with larger feature sizes, or those devices in which the feature size is optimized for power, speed, or heat generation—as can happen with sensors—can be more easily integrated with devices having different feature sizes. Additionally, by reducing the overall size of the die, the yield for chiplets tends to be higher than that of more complex, single die devices.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
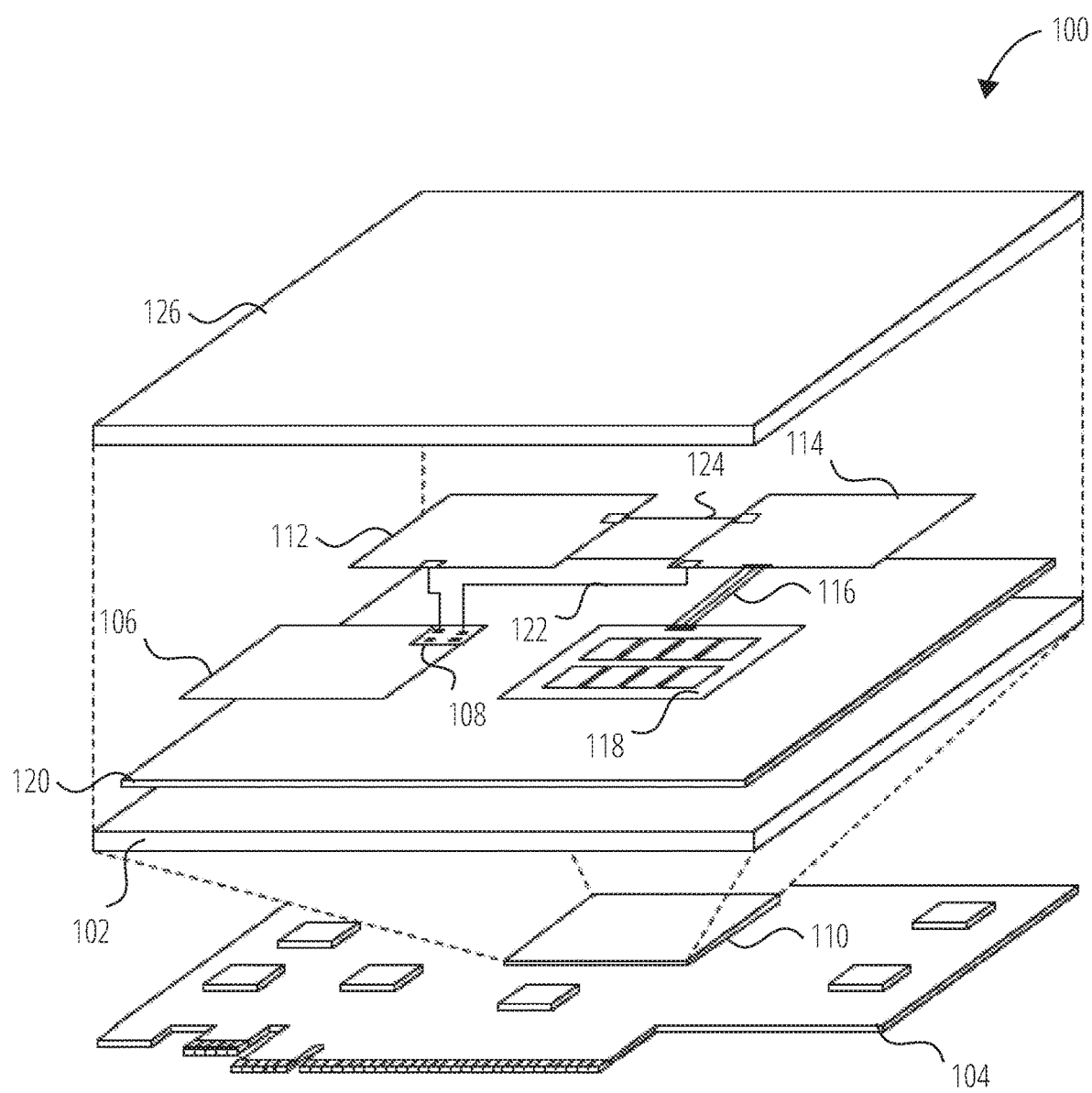
FIG. 1A illustrates a first example of a chiplet system in accordance with one embodiment.

A variety of communications protocols can be used to communicate between a host and a memory device in a system, such as a chiplet system. Examples of such protocols can include one or more of DDR5, GDDR5, DDR6, and GDDR6, Open NAND Flash Interface (ONFi), eMMC, UFS, and/or Serial Peripheral Interface (SPI), among others. These protocols generally enable the host, primary device, or controller, to communicate commands-such as write (e.g., program), read, request the status of a command, request the status of the memory device, start or perform housekeeping operations such as intra-memory transfers, garbage collection, etc.—with the memory device. Generally, these protocols restrict initiation of communication to the host. That is, the host makes a request and the memory device responds. In some examples, the memory device can issue an exception (e.g., interrupt) that is designed to prompt the host to make a request for the status of the operation subject to the exception. In some case, the memory device can issue a signal that indicates that the memory device is busy or that the host must wait to issue further commands for some defined time period or until the memory device otherwise indicates that it has completed pending operations and is available to receive and respond to further commands.

To facilitate communication among chiplets in a system, chiplets can include multiple input-output (I/O) channels (e.g., AIB channels), such as can be arranged in columns of channels at a periphery of the chiplets. The I/O channels can be configured in a manner dependent on the particular design or system objective. For example, the I/O channels of chiplets can be configured as receive (RX) channels, transmit (TX) channels, or a mix of RX/TX channels.

In an example, one or more chiplets of a system can include initialization logic circuitry to advance a chiplet I/O interface through various stages or phases of initialization. In some examples, chiplets can include a communication interface (e.g., a serial peripheral interface or SPI) and configuration data can be communicated among the chiplets using the communication interface. In some examples, the communication interface can be implemented using auxiliary channels (AUX) of the I/O channels and the configuration data can be communicated using out-of-band signaling.

In an example, initialization logic circuitry can be configured to advance initialization of a chiplet interface sequentially through the interface layers starting with a lowest interface layer (e.g., the physical layer). The initialization can advance through multiple initialization phases with one interface layer initialized during each phase by writing initialization data to the chiplet I/O channels during each initialization phase.

Not all chiplet designs may have or use the same type of initialization. For example, individual chiplets may support only a hardware-based initialization option for the I/O channels or may support only a software-based initialization option for the I/O channels. Because a chiplet-based system can include different chiplet designs mixed in the same system, and without a standard method to support both hardware-based and software-based approaches, each system would need an individual, ad hoc hardware-based or software-based initialization method. This could result in some I/O channels of the chiplets not being interoperable with other I/O channels of the chiplets.

In an example, a standardized method of initialization of the I/O channels of the chiplets can allow all chiplets of a multi-chiplet system and I/O interface to be interoperable within a single system. The standardized method can be used for both hardware-based and software-based initialization mechanisms to guarantee interoperability of the interconnected chiplet I/O channels. In an example, the initialization methods can include or use communication among chiplets using an SPI bus. The SPI bus can be used to provide communication between at least a primary device and a secondary device. As used in this description, a primary device, such as a host, may manage or control communications with or operations of one or more secondary devices. The relationship between primary and secondary devices may be an asymmetric one that has sometimes been referred to in the art using the antiquated terms master and slave. Such relationships may also be referred to as parent/child, supervisor/worker, controller/peripheral, or the like.

An issue with traditional SPI communications arises when primary and secondary devices on an SPI interface are not similarly configured for parity-protected communications. For example, a secondary device may not include resources that are configured or sufficient to calculate payload parity information. In other words, an issue with traditional SPI communications can include a lack of parity protection in communications between a primary device and some secondary devices. In an example, without means to provide parity protection on a per-device basis, either all data communications on the interface may be unprotected, or all devices on the interface may be required to include or support parity protection.

To address the issue, an SPI communication system (or other analogous communication system) can be configured to support communications with devices that support parity protection, and to support communications with devices that do not support parity protection. In other words, the solution can include enabling devices configured with and without parity protection to reside on or use the same SPI interface or bus. A chiplet (or other) system that provides for conditional use of parity in data communications can thus be highly flexible in its configuration since individual chiplets (or other devices) that support parity or do not support parity can be used together.

In an example, a solution to the unprotected communications issue can include using odd parity fields within payload fields of data messages exchanged using the SPI interface whenever primary and secondary devices support such communications. Parity checking can optionally be disabled by default, such as when the SPI interface emerges from a reset or off condition. Following reset, an SPI primary device on the interface can query secondary devices on the interface to determine which, if any, of the devices supports parity protection. For example, the primary device can be configured to query a software-accessible parity capability status register on one or multiple different secondary devices on the same SPI interface. The respective parity capability status registers on the secondary devices can include one or more bits that indicate a parity or processing capacity of the device, such as to indicate whether the secondary device supports or does not support parity-protected communications. Using results from the query activity, the primary device can populate a primary device parity control register, such as at the primary device, such as can include one or more bits per secondary device or endpoint in the system.

In an example, the primary device can be configured to write information to a software-accessible parity enable control register on the respective secondary devices to indicate whether parity-protected communications are enabled or disabled for each secondary device. The respective secondary devices can use information from a parity enable control register to determine whether messages received from the primary device are expected to include or use parity information. Accordingly, the respective secondary devices can use information from their parity enable control registers to determine whether to use or ignore parity bits or parity fields in messages.

In an example, when a secondary device receives a transaction request, or a message from a primary device, and odd parity is enabled, then the secondary device can check the parity information in a parity field of the transaction request or message. If odd parity is disabled at the secondary device, then the secondary device can be configured to ignore the information in the parity field of the transaction request or message. In an example, the primary device can use information from the primary device parity control register to determine if the primary device should check the odd parity of any returned payloads from a secondary device. That is, the primary device can be configured to look up a parity status for a particular secondary device from the device parity control register. If the device parity control register indicates that the particular secondary device is configured to use parity protection, then the primary device can be configured to check parity information in messages from the particular secondary device.

FIG. 1A, described below, offers an example of a chiplet system and the components operating therein. Within the context of such a chiplet system, an issue can arise in communication among the chiplets or in communication with other systems or devices coupled to the chiplet system. In a chiplet system that includes a serial peripheral interface (SPI) bus or interface, a first peripheral device or a secondary device generally can be configured to respond to a read request from a controller or primary device within a specified number of clock cycles. The SPI interface, which is generally coupled to one or multiple other secondary devices, can be inhibited from carrying out other data communication until the first secondary device, or first selected chiplet, sends its complete response. The present inventors have recognized, among other things, that a solution to this issue can include using a secondary device status field in an SPI message. The secondary device status field can indicate when a secondary device is ready to send a response. If the secondary device status field indicates the secondary device is not ready to respond, then the primary device can be configured to issue a later request or deferred request. The present inventors have further recognized, among other things, that the primary device can be configured to use information from the secondary device status field to validate or confirm a transaction status. In an example, the primary device can be configured to identify or confirm a presence or absence of one or more endpoints or secondary devices on the SPI bus, such as at initialization or at other times during operation, using information received at a data input port of the primary device when a secondary device status field is expected. For example, the primary device can be configured to sense its own pull-up behavior at its data input port when no secondary device endpoint is present on the data channel that is coupled to the data input port of the primary device. Additional details and examples are provided below.

Figure 1B:
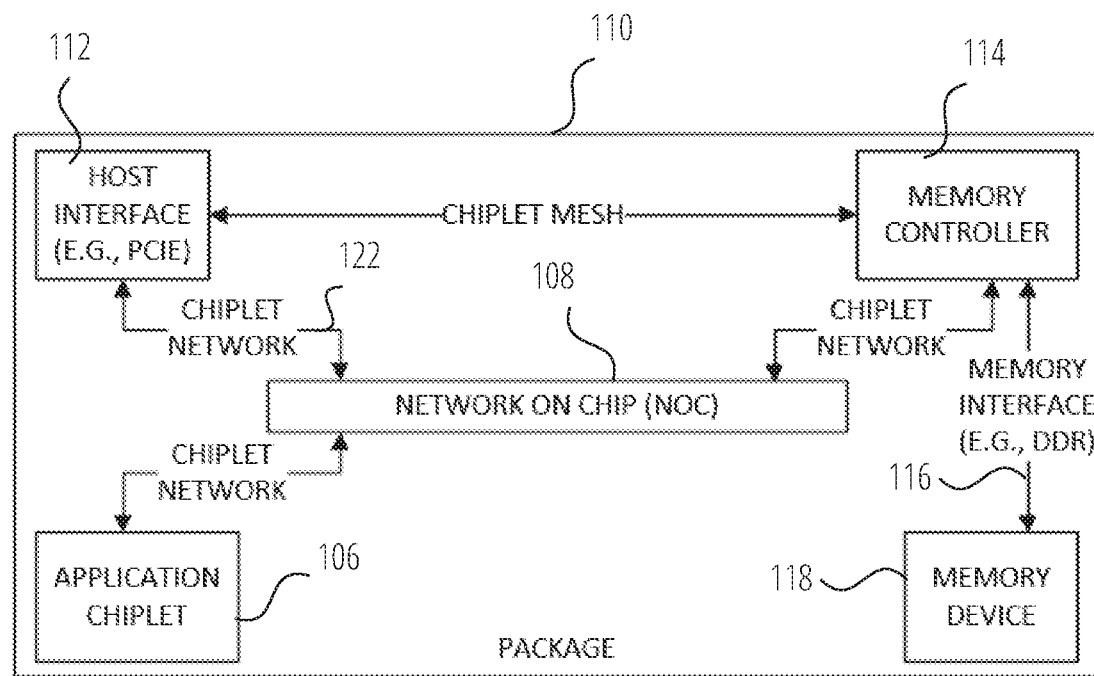
FIG. 1B illustrates a second example of a chiplet system in accordance with one embodiment.

FIG. 1A and FIG. 1B illustrate an example of a first system 100 that can include one or more chiplets, according to an embodiment. FIG. 1A is a representation of the chiplet system 110 mounted on a peripheral board 104, that can be connected to a broader computer system by a peripheral component interconnect express (PCIe), for example. The chiplet system 110 includes a package substrate 102, an interposer 120, and four chiplets, an application chiplet 106, a host interface chiplet 112, a memory controller chiplet 114, and a memory device chiplet 118. Other systems may include additional chiplets to provide additional functionalities, as will be apparent from the following discussion. The package of the chiplet system 110 is illustrated with a cover or lid 126, though other packaging techniques and structures for the chiplet system 110 can be used. FIG. 1B is a block diagram labeling the components in the chiplet system for clarity.

The application chiplet 106 is illustrated as including a network-on-chip (NOC 108) to support an inter-chiplet communications network, or chiplet network 122. In example embodiments, NOC 108 may be included on the application chiplet 106. In some examples, NOC 108 may be defined in response to selected support chiplets (e.g., the host interface chiplet 112, memory controller chiplet 114, or memory device chiplet 118) thus enabling a designer to select an appropriate number or chiplet network connections or switches for the NOC 108. In an example, the NOC 108 can be located on a separate chiplet, or even within the interposer 120. In examples as discussed herein, the NOC 108 implements an inter-chiplet communications network as a chiplet protocol interface (CPI) network.

The CPI is a packet-based network that supports virtual channels to enable a flexible and high-speed interaction between chiplets. CPI enables bridging from intra-chiplet networks to the chiplet network 122. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI successfully bridges intra-chiplet networks across the chiplet network 122.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB controller or peripheral depending on which chiplet provides the controller clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half RX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 106, provides a sender, such as the memory controller chiplet 114, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender to allow transmitting of additional information.

Also illustrated is a chiplet mesh network 124 that uses a direct, chiplet-to-chiplet technique without the need for the NOC 108. The chiplet mesh network 124 can be implemented in CPI, or another chiplet-to-chiplet protocol. The chiplet mesh network 124 generally enables a pipeline of chiplets where one chiplet serves as the interface to the pipeline while other chiplets in the pipeline interface only with themselves.

Additionally, dedicated device interfaces, such as an SPI interface or one or more standard memory interfaces, such as the memory interface 116 (such as, for example, synchronous memory interfaces, such as DDR5, DDR6), can also be used to interconnect chiplets. Connection of a chiplet system or individual chiplets to external devices such as a larger system can be through a desired interface, for example, a PCIe interface. Such an external interface may be implemented, in some examples, through a host interface chiplet 112, which in the depicted examples, provides a PCIe interface external to the chiplet system 110. Such dedicated interfaces are generally employed when a convention or standard in the industry has converged on such an interface. The illustrated example of a Double Data Rate (DDR) interface 116 connecting the memory controller chiplet 114 to a dynamic random access memory (DRAM) memory device is an example of such an industry convention.

Of the variety of possible support chiplets, the memory controller chiplet 114 is likely present in the chiplet system 110 due to the near omnipresent use of storage for computer processing as well as sophisticated state-of-the-art memory devices. Thus, using a memory device chiplet 118 and memory controller chiplet 114 produced by others gives chiplet system designers access to robust products by sophisticated producers. Generally, the memory controller chiplet 114 provides a memory device specific interface to read, write, or erase data. Often, the memory controller chiplet 114 can provide additional features, such as error detection, error correction, maintenance operations, or atomic operation execution. For some types of memory, maintenance operations tend to be specific to the memory device chiplet 118, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In some flash memory configurations, for example, "managed NAND" devices, some or all of such management operations can be under control of a dedicated NAND memory controller coupled to multiple NAND memory die. In other types of memory, for example DRAM, some memory operations, such as refresh, may be controlled by a host processor or by a memory controller at some times, and at other times controlled by the DRAM memory device itself, or by logic associated with one or more DRAM devices, such as an interface chip (in some examples, a buffer). Such an interface/buffer may be utilized in some examples to redistribute and change the clock rate of signals between an interface and individual memory devices. In some examples, such an interface/buffer may incorporate additional control functionality.

Atomic operations are a data manipulation that, for example, may be performed by the memory controller chiplet 114. In other chiplet systems, the atomic operations may be performed by other chiplets. For example, an atomic operation of "increment" can be specified in a command by the application chiplet 106, the command including a memory address and possibly an increment value. Upon receiving the command, the memory controller chiplet 114 retrieves a number from the specified memory address, increments the number by the amount specified in the command, and stores the result. Upon a successful completion, the memory controller chiplet 114 provides an indication of a command success to the application chiplet 106. Atomic operations avoid transmitting the data across the chiplet network 122, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can run on a programmable atomic unit (PAU) (e.g., a custom atomic unit (CAU)) of the memory controller chiplet 114. FIG. 1A illustrates an example of a memory controller chiplet that discusses a PAU.

The memory device chiplet 118 can be, or include any combination of, volatile memory devices or non-volatile memories. Examples of volatile memory devices include, but are not limited to, random access memory (RAM)—such as DRAM, synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device chiplet 118 as a chiplet, however, the memory device chiplet 118 can reside elsewhere, such as in a different package on the peripheral board 104. For many applications, multiple memory device chiplets may be provided. In some examples, these memory device chiplets may each implement one or multiple storage technologies. In some examples, a memory chiplet may include, multiple stacked memory die of different technologies, for example one or more SRAM devices stacked or otherwise in communication with one or more DRAM devices. Memory controller chiplet 114 may also serve to coordinate operations between multiple memory chiplets in the chiplet system 110; for example, to utilize one or more memory chiplets in one or more levels of cache storage, and to use one or more additional memory chiplets as main memory. Chiplet system 110 may also include multiple memory controllers, as may be used to provide memory control functionality for separate processors, sensors, networks, etc. A chiplet architecture, such as in the chiplet system 110 offers particular advantages in allowing adaptation to different memory storage technologies, and different memory interfaces, through updated chiplet configurations, without requiring redesign of the remainder of the system structure.

Figure 2:
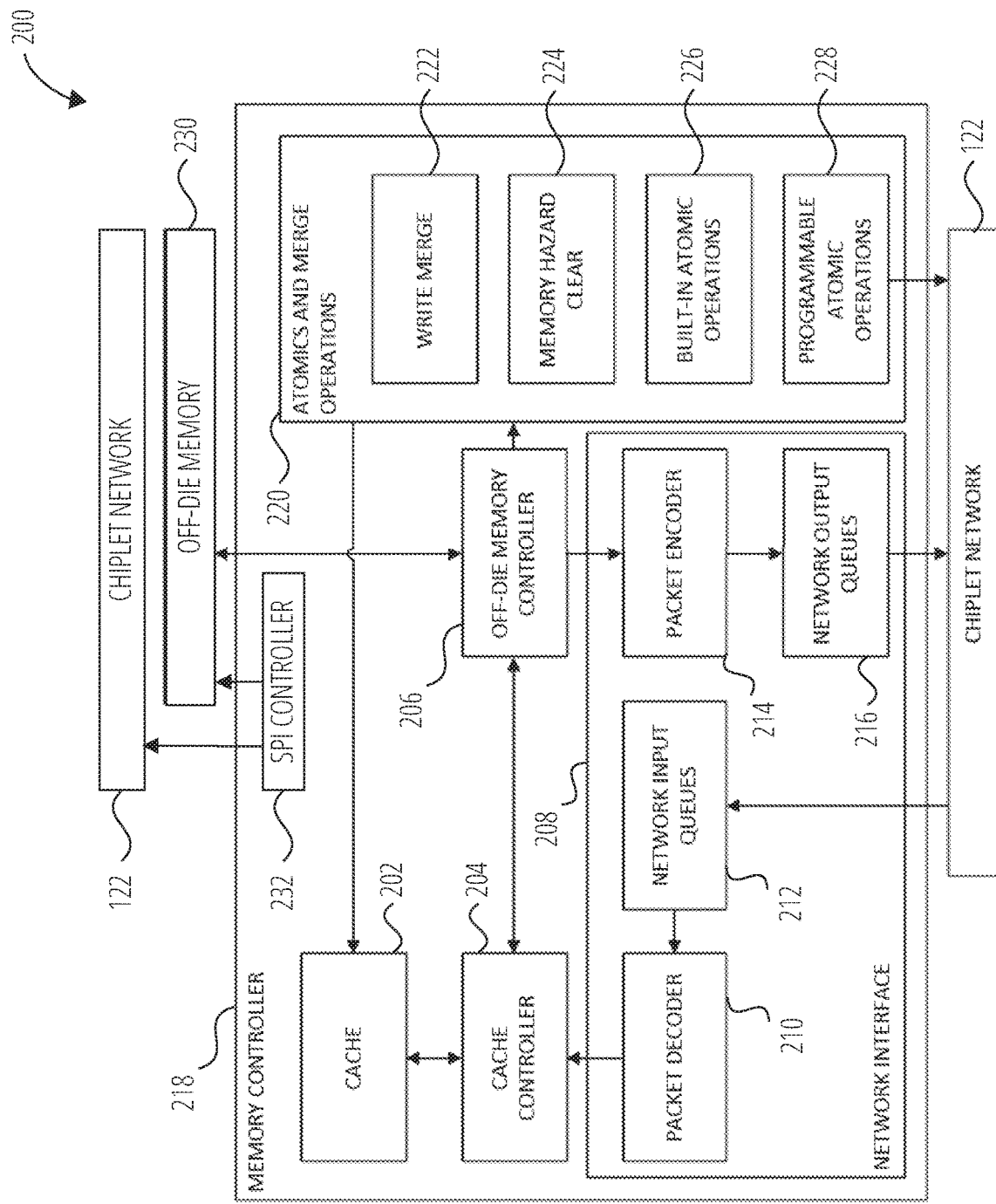
FIG. 2 illustrates an example of a memory controller chiplet in accordance with one embodiment.

FIG. 2 illustrates components of an example of a memory controller chiplet 218, such as the memory controller chiplet 114 of FIG. 1A, according to an embodiment. The memory controller chiplet 218 includes a cache 202, a cache controller 204, an off-die memory controller 206 (e.g., to communicate with an off-die memory 230), a network communication interface 208 (e.g., to interface with the chiplet network 122) and communicate with other chiplets), an SPI controller 232, and a set of atomic and merge operations 220. Members of this set can include, for example, a write merge unit 222, a hazard unit (memory hazard clear unit 224), built-in atomic unit 226, or a PAU 228. The various components are illustrated logically, and not as they necessarily would be implemented. For example, the built-in atomic unit 226 likely comprises different devices along a path to the off-die memory. For example, the built-in atomic unit 226 could be located in an interface device/buffer on a memory chiplet, as discussed above. In contrast, the programmable atomic operations are likely implemented in a separate processor on the memory controller chiplet 218 (but in various examples may be implemented in other locations, for example on a memory chiplet).

The off-die memory controller 206 is directly coupled to the off-die memory 230 (e.g., via a bus or other communication connection) to provide write operations and read operations to and from the off-die memory 230. In the depicted example, the off-die memory controller 206 is also coupled for output to the atomic and merge operations 220, and for input to the cache controller 204 (e.g., a memory side cache controller). In an example, the off-die memory controller 206 can be coupled to the off-die memory 230 using an SPI bus.

In an example, the off-die memory controller 206 (e.g., a memory controller for off-die memory) can include or comprise a portion of the SPI controller 232. The SPI controller 232 can be coupled to an SPI bus and configured to manage communication between the memory controller chiplet 114 and one or more other chiplets, such as other chiplets in the chiplet network 122 or the off-die memory 230. In an example, the memory controller chiplet 114 can use the SPI controller 232 to carry out initialization routines with various chiplets coupled to the memory controller chiplet 114. Once initialized, the memory controller chiplet 114 can continue to use SPI-based communications with the chiplets or can change to using other protocols or busses.

In an example, the SPI controller 232 or bus controller can be provided on the host interface chiplet 112, and the host interface chiplet 112 can use a PCIe interface to communicate outside of the chiplet system 110. A memory controller, such as the memory controller chiplet 114, can be an SPI memory device or SPI secondary device. The memory controller can, in turn, be configured to use another memory interface such as the memory interface 116.

In the example configuration, the cache controller 204 is directly coupled to the cache 202, and may be coupled to the network communication interface 208 for input (such as incoming read or write requests), and coupled for output to the off-die memory controller 206.

The network communication interface 208 includes a packet decoder 210, network input queues 212, a packet encoder 214, and network output queues 216 to support a packet-based chiplet network 122, such as CPI. The chiplet network 122 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 122 can be implemented as a collection of crossbar switches having a folded clos configuration, or a mesh network providing for additional connections, depending upon the configuration.

In various examples, the chiplet network 122 can be part of an asynchronous switching fabric. Here, a data packet can be routed along any of various paths, such that the arrival of any selected data packet at an addressed destination can occur at any of multiple different times, depending upon the routing. Additionally, the chiplet network 122 can be implemented at least in part as a synchronous communication network, such as a synchronous mesh communication network. Both configurations of communication networks are contemplated for use in accordance with the present disclosure.

The memory controller chiplet 218 can receive a packet having, for example, a source address, a read request, and a physical address. In response, the off-die memory controller 206 or the cache controller 204 will read the data from the specified physical address (which can be in the off-die memory 230 or in the cache 202), and assemble a response packet to the source address containing the requested data. Similarly, the memory controller chiplet 218 can receive a packet having a source address, a write request, and a physical address. In response, the memory controller chiplet 218 will write the data to the specified physical address (which can be in the off-die memory 230 or in the cache 202), and assemble a response packet to the source address containing an acknowledgement that the data was stored to a memory.

Thus, the memory controller chiplet 218 can receive read and write requests via the chiplet network 122 and process the requests using the cache controller 204 interfacing with the cache 202, if possible. If the request cannot be handled by the cache controller 204, then the off-die memory controller 206 handles the request by communication with the off-die memory 230, the atomic and merge operations 220, or both. As noted above, one or more levels of cache may also be implemented in off-die memory 230 and in some such examples may be accessed directly by the cache controller 204. Data read by the off-die memory controller 206 can be cached in the cache 202 by the cache controller 204 for later use.

The atomic and merge operations 250 are coupled to receive (as input) the output of the off-die memory controller 220, and to provide output to the cache 210, the network communication interface 225, or directly to the chiplet network 280. The reset or memory hazard clear unit 224, write merge unit 222, and the built-in (e.g., predetermined) built-in atomic unit 226 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 228 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 222 receives read data and request data, and merges the request data and read data to create a single unit having the read data and the source address to be used in the response or return data packet). The write merge unit 222 provides the merged data to the write port of the cache 202 (or, equivalently, to the cache controller 204 to write to the cache 202). Optionally, the write merge unit 222 provides the merged data to the network communication interface 208 to encode and prepare a response or return data packet for transmission on the chiplet network 122.

When the request data is for a built-in atomic operation, the built-in atomic unit 226 receives the request and reads data, either from the write merge unit 222 or directly from the off-die memory controller 206. The atomic operation is performed, and using the write merge unit 222, the resulting data is written to the cache 202, or provided to the network communication interface 208 to encode and prepare a response or return data packet for transmission on the chiplet network 122.

The built-in atomic unit 226 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 122. The request packet has a physical address, atomic operator type, operand size, and optionally up to 32-bytes of data. The atomic operation performs the read-modify-write to a cache memory line of the cache 202, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as a comparatively simple, single cycle, integer atomics-such as fetch-and-increment or compare-and-swap-which will occur with the same throughput as a regular memory read or write operation not involving an atomic operation. For these operations, the cache controller 204 may generally reserve a cache line in the cache 202 by setting a hazard bit (in hardware), so that the cache line cannot be read by another process while it is in transition. The data is obtained from either the off-die memory 230 or the cache 202, and is provided to the built-in atomic unit 226 to perform the requested atomic operation. Following the atomic operation, in addition to providing the resulting data to the packet encoder 214 to encode outgoing data packets for transmission on the chiplet network 122, the built-in atomic unit 226 provides the resulting data to the write merge unit 222, which will also write the resulting data to the cache 202. Following the writing of the resulting data to the cache 202, any corresponding hazard bit which was set will be cleared by the memory hazard clear unit 224.

The PAU 228 enables high performance (high throughput and low latency) for programmable atomic operations (also referred to as "custom atomic operations"), comparable to the performance of built-in atomic operations. Rather than executing multiple memory accesses, in response to an atomic operation request designating a programmable atomic operation and a memory address, circuitry in the memory controller chiplet 218 transfers the atomic operation request to PAU 228 and sets a hazard bit stored in a memory hazard register corresponding to the memory address of the memory line used in the atomic operation, to ensure that no other operation (read, write, or atomic) is performed on that memory line, which hazard bit is then cleared upon completion of the atomic operation. Additional, direct data paths provided for the PAU 228 executing the programmable atomic operations allow for additional write operations without any limitations imposed by the bandwidth of the communication networks and without increasing any congestion of the communication networks.

The PAU 228 includes a multi-threaded processor, for example, such as a RISC-V ISA based multi-threaded processor having one or more processor cores, and further having an extended instruction set for executing programmable atomic operations. When provided with the extended instruction set for executing programmable atomic operations, the PAU 228 can be embodied as one or more hybrid threading processors. In some example embodiments, the PAU 228 provides barrel-style, round-robin instantaneous thread switching to maintain a high instruction-per-clock rate.

Programmable atomic operations can be performed by the PAU 228 involving requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the predetermined atomic operations, insofar as they are defined by the user rather than a system vendor. For these operations, the cache controller 204 can reserve a cache line in the cache 202, by setting a hazard bit (in hardware), so that cache line cannot be read by another process while it is in transition. The data is obtained from either the off-die memory 230 or the cache 202, and is provided to the PAU 228 to perform the requested programmable atomic operation. Following the atomic operation, the PAU 228 will provide the resulting data to the network communication interface 208 to directly encode outgoing data packets having the resulting data for transmission on the chiplet network 122. In addition, the PAU 228 will provide the resulting data to the cache controller 204, which will also write the resulting data to the cache 202. Following the writing of the resulting data to the cache 202, any corresponding hazard bit which was set will be cleared by the cache controller 204.

In selected examples, the approach taken for programmable atomic operations is to provide multiple, generic, custom atomic request types that can be sent through the chiplet network 122 to the memory controller chiplet 218 from an originating source such as a processor or other system component. The cache controller 204 and/or off-die memory controller 206 identify the request as a custom atomic and forward the request to the PAU 228. In a representative embodiment, the PAU 228: (1) is a programmable processing element capable of efficiently performing a user defined atomic operation; (2) can perform load and stores to memory, arithmetic and logical operations and control flow decisions; and (3) leverages the RISC-V ISA with a set of new, specialized instructions to facilitate interacting with the controllers to atomically perform the user-defined operation. In desirable examples, the RISC-V ISA contains a full set of instructions that support high level language operators and data types. The PAU 228 can leverage the RISC-V ISA, but will commonly support a more limited set of instructions and limited register file size to reduce the die size of the unit when included within the memory controller chiplet 218.

As mentioned above, prior to the writing of the read data to the cache 202, the set hazard bit for the reserved cache line is to be cleared, by the memory hazard clear unit 224. Accordingly, when the request and read data is received by the write merge unit 222, a reset or clear signal can be transmitted by the memory hazard clear unit 224 to the cache 202 to reset the set memory hazard bit for the reserved cache line. Also, resetting this hazard bit will also release a pending read or write request involving the designated (or reserved) cache line, providing the pending read or write request to an inbound request multiplexer for selection and processing.

In an example, a chiplet system can be configured to include or use a serial peripheral interface (SPI) bus or interface. An SPI bus generally includes a multiple-wire serial communication interface that enables a synchronous data link between two devices, a primary device and a secondary device. It provides support for a low to medium bandwidth network connection between the devices supporting the SPI. In a chiplet system with an SPI bus, the primary device can be a first chiplet, and the secondary device, or secondary devices, can be one or more other chiplets coupled to the first chiplet using the SPI bus.

The wires of the SPI bus typically include two control channels and two data channels. The control channels of the SPI bus include a chip select (CS) channel, and a serial clock channel (SCLK). In some examples, more than one secondary device can be connected to the primary device, however, only one secondary device can generally be accessed at any given time. Selection of a particular secondary device from among multiple secondary devices can be accomplished using the chip select or CS channel. A CS signal is outputted from the primary device and allows for activation and deactivation of a secondary device by the primary device. In an example, every secondary device can use its own separate CS channel for activation. In other examples discussed herein, a single multiple-drop CS channel can be used for global activation or deactivation of multiple secondary devices, and unique secondary device identifiers can be used to select a particular secondary device to receive a command from the primary device.

The primary device can also provide a serial clock signal. The clock signal can be used to clock the shifting of serial data into and out of the primary and secondary devices. Use of this clock allows SPI architecture to operate in a primary/secondary full duplex mode, wherein data can be transferred simultaneously from one device to another.

The data channels of the SPI bus can include a Serial Data In (SDI) line and a Serial Data Out (SDO) line. The SDI line is a data communication line that outputs data from the primary device to the secondary device. The SDO line is a second data communication line used to output data from the secondary device to the primary device. Both data channels are active when the chip select channel is activated for the specified secondary device, unless the specified secondary device is configured to operate in an always-on manner.

In an example, initialization of I/O channels of multiple chiplets in the chiplet system 110 can include or use an SPI bus. Using the SPI bus, I/O channels for all chiplets of a multi-chiplet I/O interface can be interoperable within a single system. The SPI-based techniques discussed herein can be used for both hardware-based and software-based initialization mechanisms to guarantee interoperability of the interconnected chiplet I/O channels.

Figure 3:
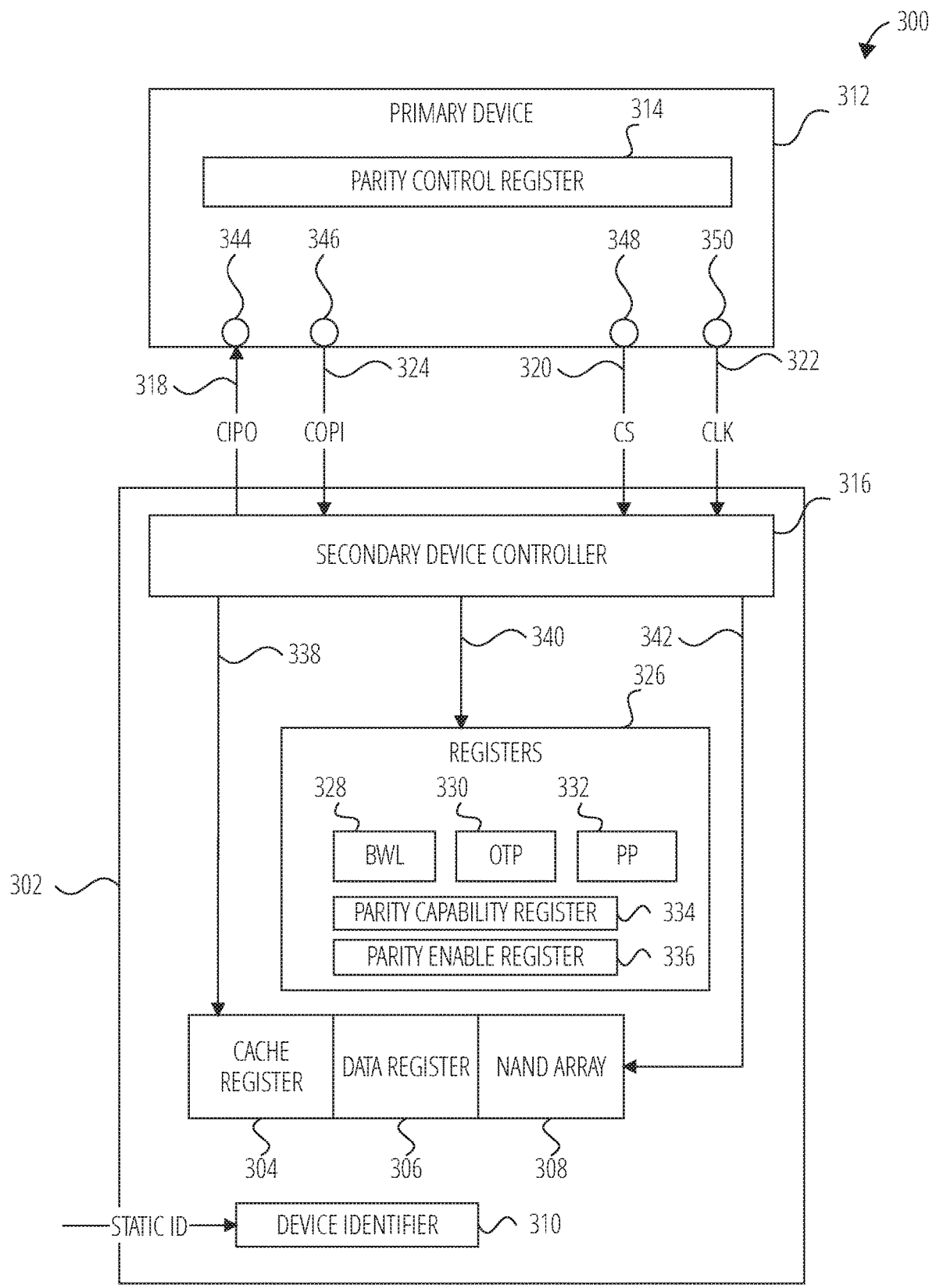
FIG. 3 illustrates an SPI system in accordance with one embodiment.

FIG. 3 illustrates generally an example of an SPI system 300. The SPI system 300 can include a primary device 312 or first chiplet interfaced with a secondary device or second chiplet, such as an SPI memory device 302. In an example, the SPI system 300 can comprise a portion of the first system 100 from the example of FIG. 1A, or the first example 200 from the example of FIG. 2. For example, one or more of the primary device 312 and the SPI memory device 302 can be a respective chiplet in the first system 100. In an example, the first system 100 includes the primary device 312, the SPI memory device 302 resides outside of the first system 100, and the primary device 312 communicates with the SPI memory device 302 using an SPI interface.

In an example, the primary device 312 comprises the memory controller chiplet 114 and the SPI controller 232, and the off-die memory 230 comprises the SPI memory device 302. The primary device 312 can include ports for coupling to respective channels or busses in an SPI interface. For example, the primary device 312 can include a data input port 344 configured to receive data signals from a data communication channel, a data output port 346 configured to provide data signals to a different data communication channel, a chip select signal port 348 configured to provide a chip select signal to one or multiple secondary devices using a chip select signal bus, and a clock signal port 350 configured to provide a system clock signal to a clock signal channel.

In an example, one or more of the ports of the primary device 312 can include or use buffer circuitry, such as tri-state buffer circuitry. For example, the data input port 344 or the data output port 346 can include respective tri-state buffer circuitry. The buffer circuitry can be provided internally to the primary device 312 or can be external. In an example, the data input port 344 is coupled to pull-up circuitry that is configured to maintain a fixed voltage or current at the data input port 344, such as when the bus or channel coupled to the data input port 344 is unused or unoccupied, such as between data transactions or when no secondary device on the bus is selected by the primary device 312.

In an example, the primary device 312 can include a parity control register 314. The parity control register 314 can include a data register or memory location that is configured to store information about a parity enablement or parity capability of one or multiple secondary devices that are in communication with the primary device 312. In an example, the parity control register 314 comprises a lookup table with entries for each secondary device in a system. Information in the lookup table can indicate whether a particular one of the secondary devices is configured to use or not use parity-protected communications.

The primary device 312 can use information from the parity control register 314 to determine whether or how to populate one or more parity bits in messages sent to particular ones of the secondary devices. The primary device 312 can additionally or alternatively use information from the parity control register 314 to determine whether a message received from a particular secondary device includes, or is likely to include, one or more parity bits.

In an example, the parity control register 314 can include information about a structure or syntax of messages. For example, the parity control register 314 can include information about whether a particular message field, such as a command field, a chiplet identification field, a register address field, a payload field, a secondary device status field, or other field, includes or uses a parity bit.

A peripheral device or secondary device, such as the SPI memory device 302, can include a secondary device controller 316 with multiple interface ports or pins, including a chip select (CS) port to receive a select signal 320, a clock (SCLK) port to receive a clock signal 322, a controller output peripheral input port (COPI port or MOSI port) port to receive a secondary device input signal 324 from the primary device 312, and a controller input peripheral output port (CIPO port or MISO port) to provide a secondary device output signal 318 to the primary device 312. Data transfer between the primary device 312 and the SPI memory device 302 or secondary device can take place serially and synchronously using the secondary device output signal 318 and the secondary device input signal 324. In an example, the CIPO port of the SPI memory device 302 can be configured to include or use tri-state buffer circuitry. The tri-state buffer circuitry can be configured to maintain the CIPO port in a high impedance state, or an effectively electrically disconnected state, when the SPI memory device 302 is not selected for communication with the primary device 312 (e.g., selected according to a signal on the CS port). When the SPI memory device 302 is selected for communication, then the SPI memory device 302 and buffer circuitry can be configured to use logic-level communication signals (e.g., high/low signals) suitable for the given system.

In an example, the SPI memory device 302 can include a device identifier 310. The device identifier 310 can include a memory address or register that can be statically or dynamically assigned to a particular value, such as in response to a Static ID input. That is, the device identifier 310 can be statically or dynamically strapped to a value that uniquely identifies the SPI memory device 302, such as when the SPI memory device 302 is used together with other secondary devices in the SPI system 300.

In an example, the primary device 312 can enable the secondary device controller 316 by setting the chip select signal 320 low. In an example, the secondary device controller 316 can be enabled using a statically-tied chip select port at the SPI memory device 302, such as when a CS signal is unused or unavailable. After the secondary device controller 316 is enabled, the primary device 312 can send the clock signal 322 and a corresponding data signal, or secondary device input signal 324. Each bit transmitted in the secondary device input signal 324 or secondary device output signal 318 can be synchronous to either a rising edge or falling edge of the clock signal 322. In an example, the primary device 312 can provide data on the secondary device input signal 324 latched on a rising clock edge and the SPI memory device 302 can provide data on the secondary device output signal 318 on a falling edge. In this example, a first rising edge of the clock signal 322 can correspond to the first bit of the secondary device input signal 324, and subsequent rising clock edges of the clock signal 322 can correspond to subsequent bits of the secondary device input signal 324. Similarly, each bit output on the secondary device output signal 318 can transition on a falling edge of the clock signal 322. Other signal timing schemes can similarly be used.

In an example, communication between the primary device 312 and the secondary device controller 316 can begin when the primary device 312 sets the select signal 320 low. The primary device 312 can subsequently send the clock signal 322 and begin transmitting a message using the secondary device input signal 324. In an example, a message can include a one-byte command followed by a memory address of one or more whole bytes, and further followed by data of one or more whole bytes. The secondary device controller 316 can respond by sending a synchronous message using the secondary device output signal 318. Due to the nature of conventional SPI, the secondary device controller 316 can be configured to output information on the secondary device output signal 318 until a specified or expected time at which the primary device 312 expects or is configured to receive a response.

In an example, the primary device 312 can send a write register command or a read register command in a message to the secondary device controller 316. The write register command or read register command can configure the secondary device controller 316 to access memory registers 326. Data transfer to and from the secondary device controller 316 and registers 326 can use a register bus 340, such as can have a dedicated control wire. The registers 326 can include, for example, a status register to indicate device operation status and/or a special mode enable register such as a block writing lock register or BWL register 328 such as to prevent certain portions of memory from being written. In an example, the registers 326 can include a one time programmable (OTP) enable register, or OTP register 330, such as to enable reading from or writing to an OTP portion of memory, and/or a parameter page (PP) enable register, or PP register 332, such as to enable reading from or writing to a parameter page of memory. In an example, the secondary device controller 316 can be configured to access the registers 326 when it performs other internal operations.

In an example, access to the registers 326 can permit a user or client to control functional aspects of the SPI memory device 302, such as an output buffer drive strength, a desired number of clock cycles of latency for outputting data, an address cycle format to require whole bytes or to use a minimum number of addresses, and/or whether to enable or disable error correcting codes (ECC). Certain registers can hold, for example, error status information, such as can be reset upon the issuance of a register write command, while other registers can enable a user to control timing based on varying clock signal 322 frequencies. In an example, a register can be configured to enable the SPI memory device 302 to switch between different modes and interfaces, such as between SPI NAND and NAND user modes and interfaces.

In an example, to perform an operation at a specified memory address, the secondary device controller 316 can send a memory address signal using a bus to row and column decoders (not depicted). The secondary device controller 316 can control activation of the row and column decoders using a control wire. Depending on the operation, the secondary device controller 316 can, for example, load data bytes into a cache register 304 using a cache bus 338. In an example, a NAND array 308 can receive data, such as one page at a time, through a data register 306, such as in coordination with the cache register 304.

In an example, the registers 326 can include a parity capability register 334 or a parity enable register 336. The parity capability register 334 can include or store information about whether the SPI memory device 302 includes hardware or software that supports use of one or more parity bits in communications. That is, the parity capability register 334 can include information about whether the particular SPI memory device 302 is configured for parity-protected communications or for unprotected communications. A value of, or information in, the parity capability register 334 can be fixed in non-volatile memory.

In an example, the parity enable register 336 can include or store information about whether the SPI memory device 302 is presently configured for parity-protected communications with a particular primary device, such as the primary device 312. In an example, the parity enable register 336 can include a software-accessible register that can be set according to instructions from the primary device 312 about whether one or more parity bits are to be used for communication between the primary device 312 and the SPI memory device 302. In an example, the parity enable register 336 can include information about whether a particular data field or multiple data fields include or use parity protection.

In an example, a first SPI peripheral or first SPI secondary device, such as the SPI memory device 302 or other secondary device or chiplet, can be configured to respond to a read request from a controller or other chiplet, such as the primary device 312, within a specified number of clock cycles. The SPI bus, such as can be coupled to one or multiple secondary devices or chiplets, can be impeded from carrying out other data communication until the first SPI peripheral or secondary device sends a complete response to the primary device 312. The present inventors have recognized, among other things, that a solution to this bus occupation issue can include using a secondary device status field in an SPI message that is sent from the first SPI secondary device. For example, the secondary device status field can be included in the secondary device output signal 318 that is communicated to the primary device 312. The secondary device status field can indicate that the sending secondary device is or is not ready to send a response. When the secondary device status field indicates the secondary device is not ready to send a response, then the primary device 312 can be configured to issue a later or deferred request to the secondary device. Systems and methods discussed herein can thus be used to enable long latency SPI operations to proceed in the background while an SPI bus is used for other communications or transactions, such as between the primary device 312 and one or more other secondary devices. In an example, systems and methods discussed herein can be used during initialization routines for chiplet systems, for example, using SPI operations and hardware for initial communications before transitioning to other protocols or busses.

In an example, the primary device 312 can be configured to monitor a CIPO port, such as the data input port 344, for a message that includes a secondary device status field. In an example, a data communication channel coupled to the CIPO port can be unused or unoccupied during a clock period, or specified number of clock signal cycles, that corresponds to a response period or time when a response message is expected by the primary device 312. In other words, the primary device 312 can expect a response message from a secondary device, such as the SPI memory device 302, within a particular number of cycles of the clock signal 322, and the response message can be configured to include a secondary device status field. In an example that does not include a response message, the primary device 312 can be configured to read or interpret a pull-up signal at the data input port 344 as information about the secondary device status. If the pull-up signal is high for a specified number of clock cycles (e.g., one, two, or more cycles depending on the configuration of the system) then the primary device 312 can determine that a secondary device endpoint is absent from the channel.

In an example, when a secondary device responds with a deferred read response status, the primary device 312 can queue a later read request for the deferred information. Between receiving the deferred read response status information from the secondary device and issuing the later deferred read request, the primary device 312 can perform other operations using the same SPI bus. In an example, the primary device 312 can eventually issue a deferred read request, such as using a special request signal. In an example, the primary device 312 can immediately issue the deferred read request upon receipt of the deferred read response from a secondary device, or the primary device 312 can issue the deferred read request after a specified or variable blanking period.

In an example, in response to the primary device 312 issuing a deferred read request using the special request signal, the secondary device can optionally issue another deferral if the payload is not yet available. If the payload is available, then the secondary device can reply with a message that includes a successful secondary device status field and the payload.

Figure 4:
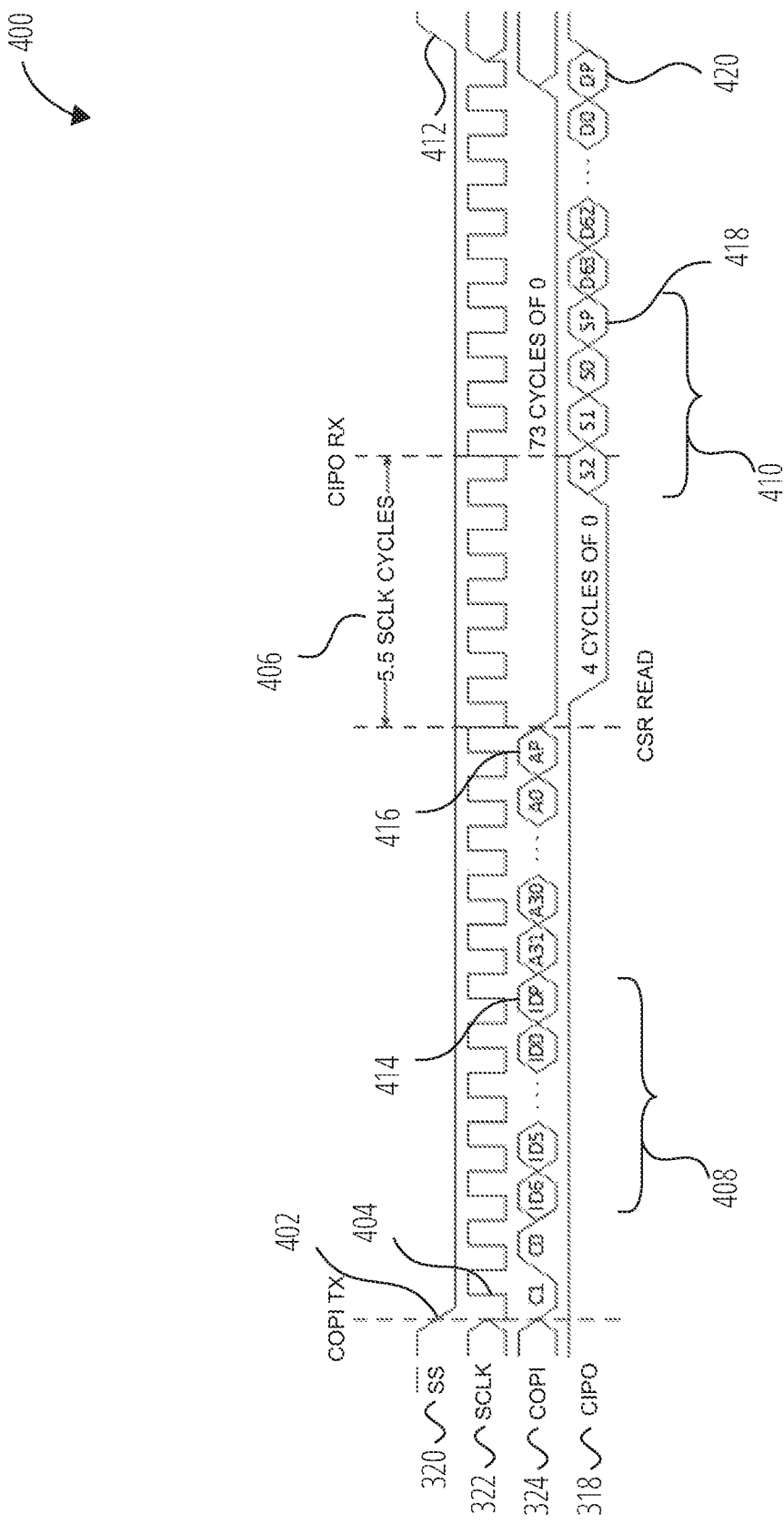
FIG. 4 illustrates a first timing diagram in accordance with one embodiment.
Figure 5:
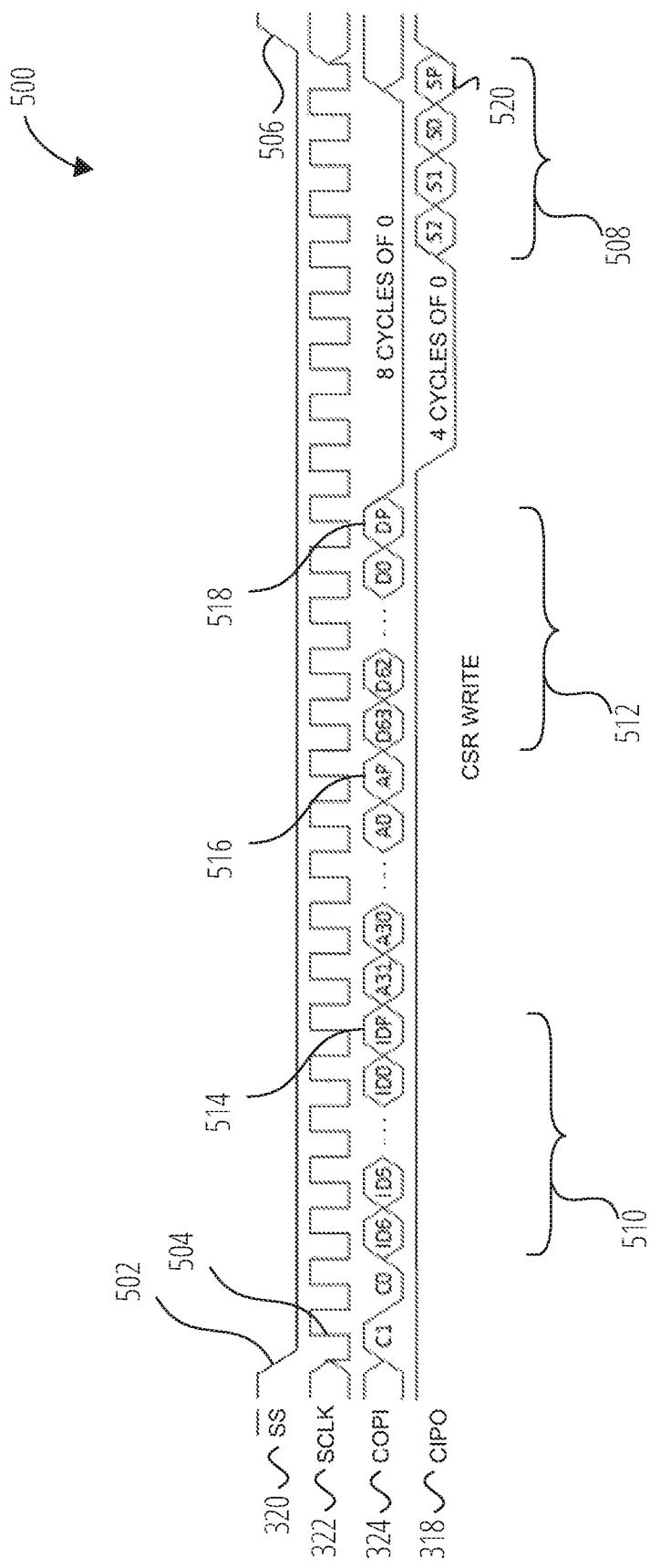
FIG. 5 illustrates a second timing diagram in accordance with one embodiment.

The examples of FIG. 4 and FIG. 5 illustrate generally example communication methods or timing diagrams that can include or use secondary device identifiers and can be used for carrying out deferred-response communications using an SPI interface. The timing diagrams describe communications using multiple different signal channels or buses on the SPI interface. Table 1 describes the conventions used in the timing diagrams for the illustrated message fields and associated message contents or usage.

TABLE 1

Example Message Fields in SPI Deferred-Response Communications

| Message Field | Usage |
| --- | --- |
| C[1:0] | 2-bit Command |
| ID[6:0] | 7-bit Chiplet Identification |
| IDP | Command and Chiplet Identification; e.g., Odd Parity |
| A[31:0] | 32-bit Address |
| AP | Address; e.g., Odd Parity |
| D[63:0] | 64-bit Read or Write Data |
| DP | Data; e.g., Odd Parity |
| S[2:0] | Secondary Device Status |
| SP | Secondary Device Status; e.g., Odd Parity |

In an example, a message sent from a primary device to a secondary device can include a 2-bit Command field (e.g., C[1:0] in Table 1). The Command field can comprise a portion of the secondary device input signal 324 and can indicate a command or instruction from the primary device 312. In an example, the Command field can include information about whether the receiving device or secondary device is directed to perform a read operation or a write operation. In an example, the Command field can indicate whether a controller request (e.g., a read request) is an initial request or a deferred request.

In an example, a message can include a 7-bit Chiplet Identification field and parity bit (e.g., ID[6:0] and IDP in Table 1). The Chiplet Identification field can include an identifier that can be used, for example, to address a particular chiplet or particular secondary device in a system, such as in the chiplet system 110. In an example, a Chiplet Identification field can be used when peripheral or secondary device SPI chip select channels are unavailable or are unused in an SPI bus. In an example, a Chiplet Identification field can be used to reduce or eliminate a number of chip select channels or lines that are required or used in an SPI bus. The parity bit associated with the Chiplet Identification field, or ID parity field, can be set when parity-protected communications are enabled between a primary device and a secondary device. In some examples where one or both of the devices do not support parity-protected communications, the ID parity field can be ignored.

In an example, a 32-bit Address and parity bit (e.g., A[31:0] and AP in Table 1) can follow the Chiplet Identification field. The Address field can be used, for example, to locate a particular register, such as in the data register 306 or elsewhere in the chiplet system 110. In an example, a 64-bit Data field and parity bit (e.g., D[63:0] and DP in Table 1) can follow the Address field. The Data field can comprise a data payload such as for storage in, or retrieval from, the secondary device. The parity bit associated with the Address field, or address parity field, can be set when parity-protected communications are enabled between a primary device and a secondary device. In some examples where one or both of the devices do not support parity-protected communications, the address parity field can be ignored.

In an example, a message that includes a Secondary Device Status field and parity bit (e.g., S[2:0] and SP in Table 1) can be provided from the secondary device to the primary device. The Secondary Device Status field can, in an example, be a one, two, three, or more bit field or message, with or without a parity bit. In the examples illustrated herein, the Secondary Device Status field comprises a 3-bit message and a parity bit, however secondary device status fields or messages can be configured to have more or fewer bits depending on an amount of information to be exchanged. Various commands or information can be encoded in a Secondary Device Status field, such as to indicate a successful operation, an unsuccessful or incomplete operation, or a fault. Table 2 describes generally various commands or information that can be encoded in a Secondary Device Status field. The parity bit associated with the Secondary Device Status field, or status parity field, can be set when parity-protected communications are enabled between a primary device and a secondary device. In some examples where one or both of the devices do not support parity-protected communications, the status parity field can be ignored.

TABLE 2

Secondary device status Message Commands

| S[2:0] | Command |
| --- | --- |
| 0 | Success; e.g., a CSR operation completed successfully |
| 1 | Deferred Read Response; e.g., a CSR Read operation was not completed |
| 2 | Odd Parity Error; e.g., a CSR operation was aborted |
| 3 | Protocol Error; e.g., a CSR operation was aborted |
| 4-6 | Reserved |
| 7 | No Secondary Device Endpoint Present |

The various message fields, usages, and message components discussed herein are examples only and should not be considered limiting. For example, other additional message fields can be used, or fewer message fields can be used in SPI deferred-response communications. In an example, the various fields can be arranged in different orders or sequences to similarly provide deferred-response communications. The various sizes or bit lengths of the fields or message components are provided as examples only.

Using the conventions provided in Table 1 and Table 2, FIG. 4 illustrates generally a first timing diagram 400 that includes using a secondary device identification field 408 for a read operation, and FIG. 5 illustrates generally a second timing diagram 500 that includes using a secondary device status field 508 for a write operation.

The example of FIG. 4 shows a general timing diagram for various signals communicated using an SPI bus, such as between the primary device 312 and the SPI memory device 302. FIG. 4 includes examples of the select signal 320, the clock signal 322, the secondary device input signal 324, and the secondary device output signal 318, such as on separate channels in an SPI bus. As mentioned above, the primary device 312 can initiate communication by setting the select signal 320 low, as generally indicated by reference numeral 402.

In the example of FIG. 4, a first rising edge 404 of the clock signal 322 corresponds to a first bit of the 2-bit Command field. In FIG. 4, the 2-bit Command field is 0-1 and indicates to the secondary device that the message includes a first or initial read instruction.

Following the Command field, the primary device 312 can send the Chiplet Identification field portion of the message, such as can include a secondary device identification field 408. The Chiplet Identification field can include an n-bit identifier of a specific one of multiple secondary devices present on the SPI bus or in the system. In the example of FIG. 4, the secondary device identification field 408 can include or use an ID field parity bit 414. The secondary device identification field 408 can be followed by an Address field, such as to indicate a register location, and the Address field can include an address field parity bit 416. The bits of the various message bit components can correspond to respective pulses in the clock signal 322. In the example of FIG. 4, a blanking period can follow the Address field.

In response to the message on the secondary device input signal 324 comprising Command, Chiplet Identification, and Address fields, the secondary device can prepare and communicate a response to the primary device 312, such as using the secondary device output signal 318. In the example of FIG. 4, the secondary device output signal 318 comprises a signal that leads with a secondary device status field 410 and includes a status field parity bit 418. Depending on the information in the secondary device status field 410, the secondary device output signal 318 can include or comprise a payload, such as comprising an n-bit Data field with a data field parity bit 420. The communication can terminate when the primary device 312 sets the select signal 320 high, such as indicated in FIG. 4 by reference numeral 412. In the example of FIG. 4, the various parity bits, such as the ID field parity bit 414, the address field parity bit 416, the status field parity bit 418, and/or the data field parity bit 420 can be set when parity-protected communications are enabled between the primary device 312 and the SPI memory device 302.

In an example, the secondary device output signal 318 can be unavailable or absent, such as when the particular secondary device that is addressed or selected by the primary device 312 is inoperative or unused. If the particular secondary device is absent, then it is unavailable to drive the CIPO port or data input port 344 of the primary device 312 in response to the read message in the secondary device input signal 324. In an example, the primary device 312 can include or use pull-up circuitry at the data input port 344 to hold the CIPO port in a non-zero state, including when the secondary device is absent from the data bus. Accordingly, the primary device 312 can be configured to read the non-zero state information from the data input port 344 due to the pull-up circuitry, such as corresponding to the secondary device identification field 408, such as during clock cycles that follow presentation of the read message. The primary device 312 can interpret the non-zero state information as a portion of the secondary device status field, such as can indicate that no secondary device endpoint is present when the non-zero state information represents a high signal over a specified number of clock cycles (e.g., when the secondary device identification field 408 is 1-1-1, such as when secondary device status field is configured to include three bits).

The example of FIG. 5 shows a second timing diagram 500 for various signals communicated using an SPI bus, such as between the primary device 312 and the SPI memory device 302. FIG. 5 includes examples of the select signal 320, the clock signal 322, the secondary device input signal 324, and the secondary device output signal 318. As mentioned above, the primary device 312 can initiate communication by setting the select signal 320 signal low, as generally indicated by reference numeral 502.

In the example of FIG. 5, a first rising edge 504 of the clock signal 322 corresponds to a first bit of the 2-bit Command field. In FIG. 5, the 2-bit Command field is 1-0 and indicates to the secondary device that the message includes a write instruction. Following the Command field, the primary device 312 can send the Chiplet Identification field with an ID field parity bit 514, such as followed by the Address field with an address field parity bit 516, such as to indicate a particular secondary device and a register location on the particular secondary device. Following the Address field, the primary device 312 can send a Data field or payload with a data field parity bit 518, such as for storage in a register indicated by the information in the Address field portion of the communication. In the example of FIG. 5, a blanking period can follow the Data field.

Following the blanking period and in response to the write instruction, the secondary device can return a message to the primary device 312 using the secondary device output signal 318. In the example of FIG. 5, the returned message can include a secondary device status field 508 with a status field parity bit 520. Using the information in the secondary device status field 508, the primary device 312 can be configured to take a particular responsive action. For example, the secondary device status field 508 can indicate to the primary device 312 that it should queue a deferred read request, such as to the same or different secondary device. Various other actions can be instructed using the secondary device status field 508, such as described above in Table 2, among others.

In an example, the secondary device output signal 318 can be unavailable or absent, such as when the particular secondary device that is addressed or selected by the primary device 312 is unavailable, inoperative or unused. If the particular secondary device is absent, then it is unavailable to drive the CIPO port or data input port 344 of the primary device 312 in response to the read message in the secondary device input signal 324. Owing to pull-up circuitry at the data input port 344 of the primary device 312, the data input port 344 can be maintained in a non-zero state, including when a secondary device is absent from the data bus. Accordingly, the primary device 312 can be configured to read the non-zero state information from the data input port 344, such as corresponding to the secondary device status field 508, following the write message from the primary device 312. The primary device 312 can interpret the non-zero state information as an indication that no secondary device endpoint is present when the non-zero state information represents a high signal over a specified number of clock cycles (e.g., when the secondary device status field 508 is 1-1-1, such as when the secondary device status field is configured to include three bits).

Figure 6:
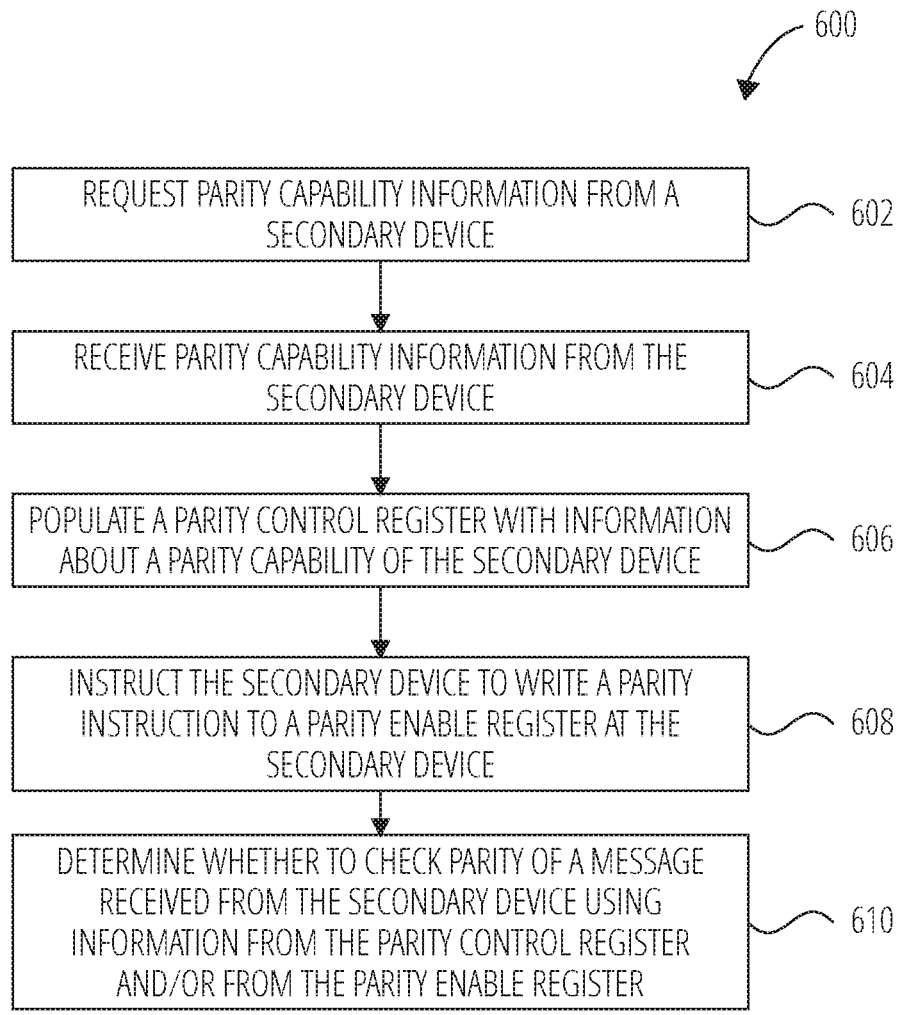
FIG. 6 illustrates generally an example of a method that can be performed at least in part by a primary device on a synchronous interface.

FIG. 6 illustrates generally an example of a first method 600 that can be performed at least in part by a primary device on a synchronous interface. The various steps or blocks in the first method 600 can be performed at or by a primary device on an SPI interface, such as using the primary device 312 on the SPI interface. The first method 600 can begin at block 602 with the primary device requesting parity capability information from a secondary device. The parity capability information can be stored in a register on the secondary device that is accessible by the primary device. The parity capability information can indicate, to the primary device, whether the secondary device is configured or equipped to perform parity-protected data communication over the SPI interface. In an example, the parity capability information is binary information about whether or not parity-protected communications are available, or the parity capability information can include information about when or under what circumstances the secondary device is configured to use parity-protected communications. In an example, block 602 can include using the primary device 312 to send a query to, or request information from, the parity capability register 334 of the SPI memory device 302. At block 604, the primary device can receive the parity capability information from the secondary device in response to the request from block 602.

At block 606, the first method 600 can include populating a parity control register on the primary device using the parity capability information received at block 604. For example, block 606 can include writing information to the parity control register 314 on the primary device 312 about the parity capability of the secondary device. In an example, block 606 can include populating a lookup table, memory array, or other software register of the primary device 312 about whether to include or use parity-protected communications with the secondary device.

In an example, the operations of block 602, block 604, and block 606 can be repeated for each secondary device on the SPI interface. That is, a first iteration of block 602, block 604, and block 606 can be performed to obtain parity capability information about a first secondary device on the SPI interface, a second iteration of block 602, block 604, and block 606 can be performed to obtain parity capability information about a different second secondary device on the SPI interface, and so on, until the primary device obtains parity capability information about each secondary device on the interface.

Following block 606, the first method 600 can include, at block 608, using the primary device to instruct the secondary device to write a parity instruction to a parity enable register at the secondary device. Block 608 can include using the primary device 312 to write information to the parity enable register 336 on the SPI memory device 302. The SPI memory device 302 can use the information from the parity enable register 336 to determine whether to set or check parity information in one or more data fields in messages communicated with the SPI memory device 302.

In an example, block 610 can include determining whether to check parity, or use parity bits, of a message received from a secondary device. For example, block 610 can include reading information from the parity control register 314 about a parity capability of the SPI memory device 302. If the information from the parity control register 314 indicates that the SPI memory device 302 supports parity-protected communications, then the primary device 312 can check parity of messages received from the SPI memory device 302. If the information from the parity control register 314 indicates that the SPI memory device 302 does not support parity-protected communications, then the primary device 312 can ignore parity information or parity fields in messages received from the SPI memory device 302.

Figure 7:
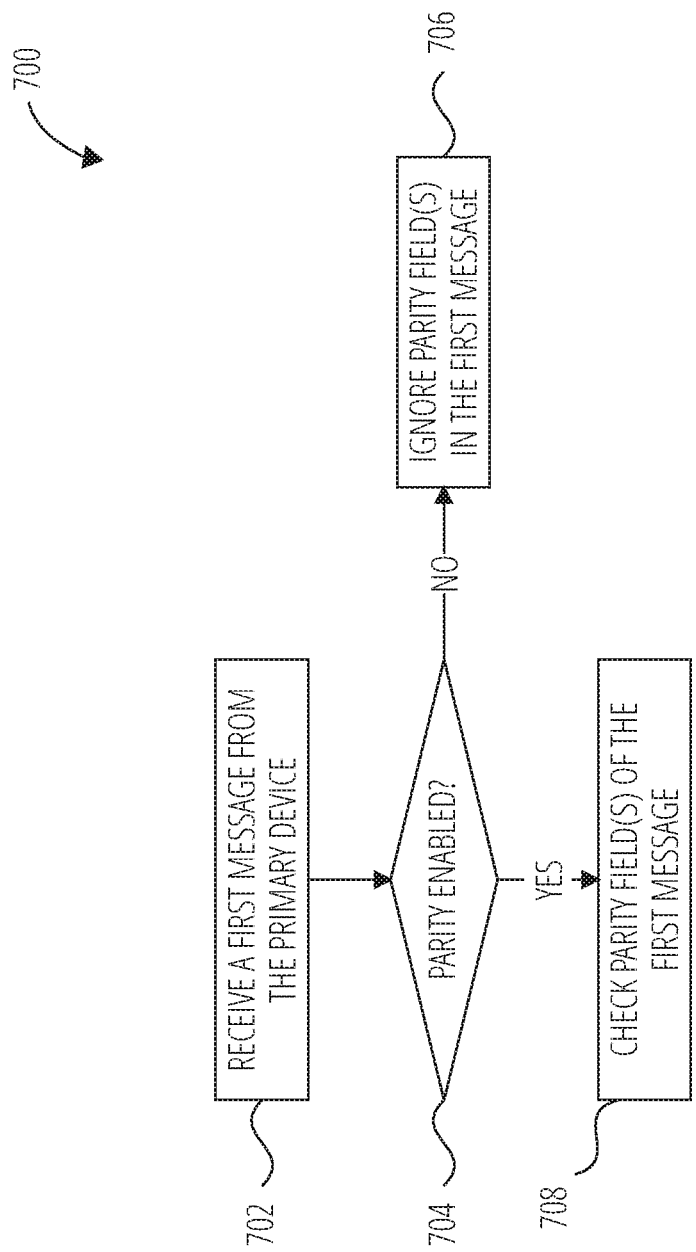
FIG. 7 illustrates generally an example of a method that includes determining a parity enablement status of a secondary device on a synchronous interface.

FIG. 7 illustrates generally an example of a second method 700 that includes determining a parity enablement status of a secondary device on a synchronous interface. The various steps or blocks in the second method 700 can be performed at or by a secondary device on an SPI interface, such as using the SPI memory device 302. The second method 700 can begin at block 702 with the secondary device receiving a first message from the primary device. In an example, block 702 includes using the SPI memory device 302 to receive a first message from the primary device 312. The first message can include one or more parity bits or fields.

At decision block 704, the secondary device can determine whether it is configured for parity-protected communications. That is, at decision block 704, the second method 700 can include determining whether parity is enabled or disabled for the secondary device. In an example, determining whether parity is enabled or disabled at decision block 704 can include using the secondary device, such as the SPI memory device 302, to read information from the parity enable register 336. The information from the parity enable register 336 can include information about whether the primary device and the secondary device are configured to use parity protection in data transactions with each other.

If decision block 704 indicates that parity protection is enabled at the secondary device, then at block 708 the secondary device can be configured to check or read one or more parity fields of the first message. If decision block 704 indicates that parity protection is disabled at the secondary device, then at block 706 the secondary device can be configured to ignore information in one or more parity fields of the first message.

Figure 8:
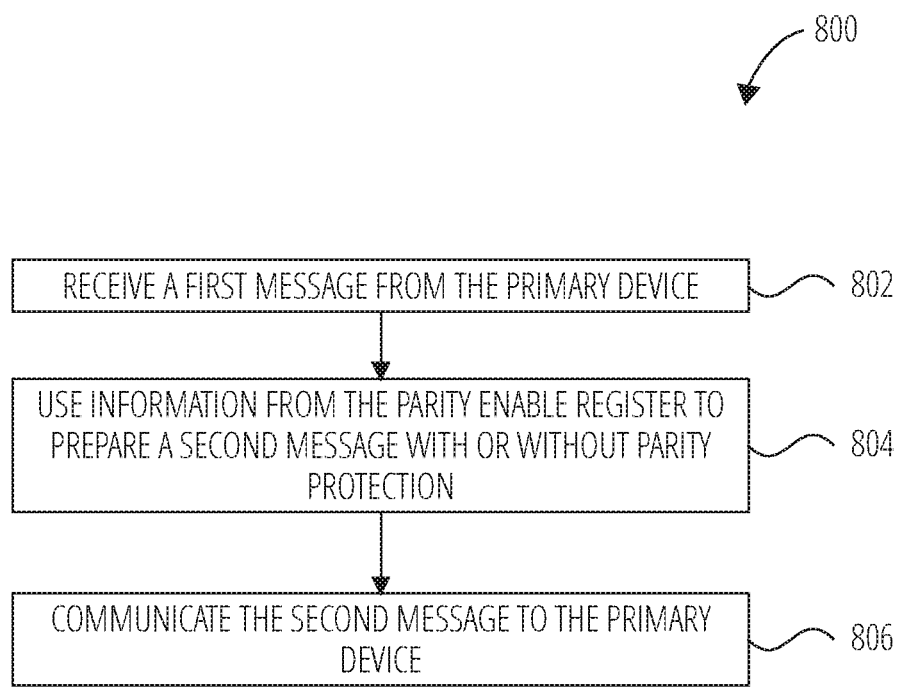
FIG. 8 illustrates generally an example of a method that includes using information from a parity enable register of a secondary device on a synchronous interface.

FIG. 8 illustrates generally an example of a third method 800 that includes using information from a parity enable register of a secondary device on a synchronous interface. The various steps or blocks in the third method 800 can be performed at or by a secondary device on an SPI interface, such as using the SPI memory device 302. The third method 800 can begin at block 802 with the secondary device receiving a first message from the primary device. In an example, block 802 includes using the SPI memory device 302 to receive a first message from the primary device 312. The first message can include one or more parity bits or fields.

At block 804, the third method 800 can include using information from a parity enable register on the secondary device to prepare a second message in response to the first message. The second message includes one or more parity bits that can be set according to the information from the parity enable register. In an example, block 804 can include using the SPI memory device 302 to read information from the parity enable register 336 about whether to set or use a parity bit in communications with the primary device 312, and accordingly preparing the second message. The third method 800 can conclude at block 806 with communicating the second message, such as with or without setting the one or more parity bits, to the primary device using the SPI interface.

Figure 9:
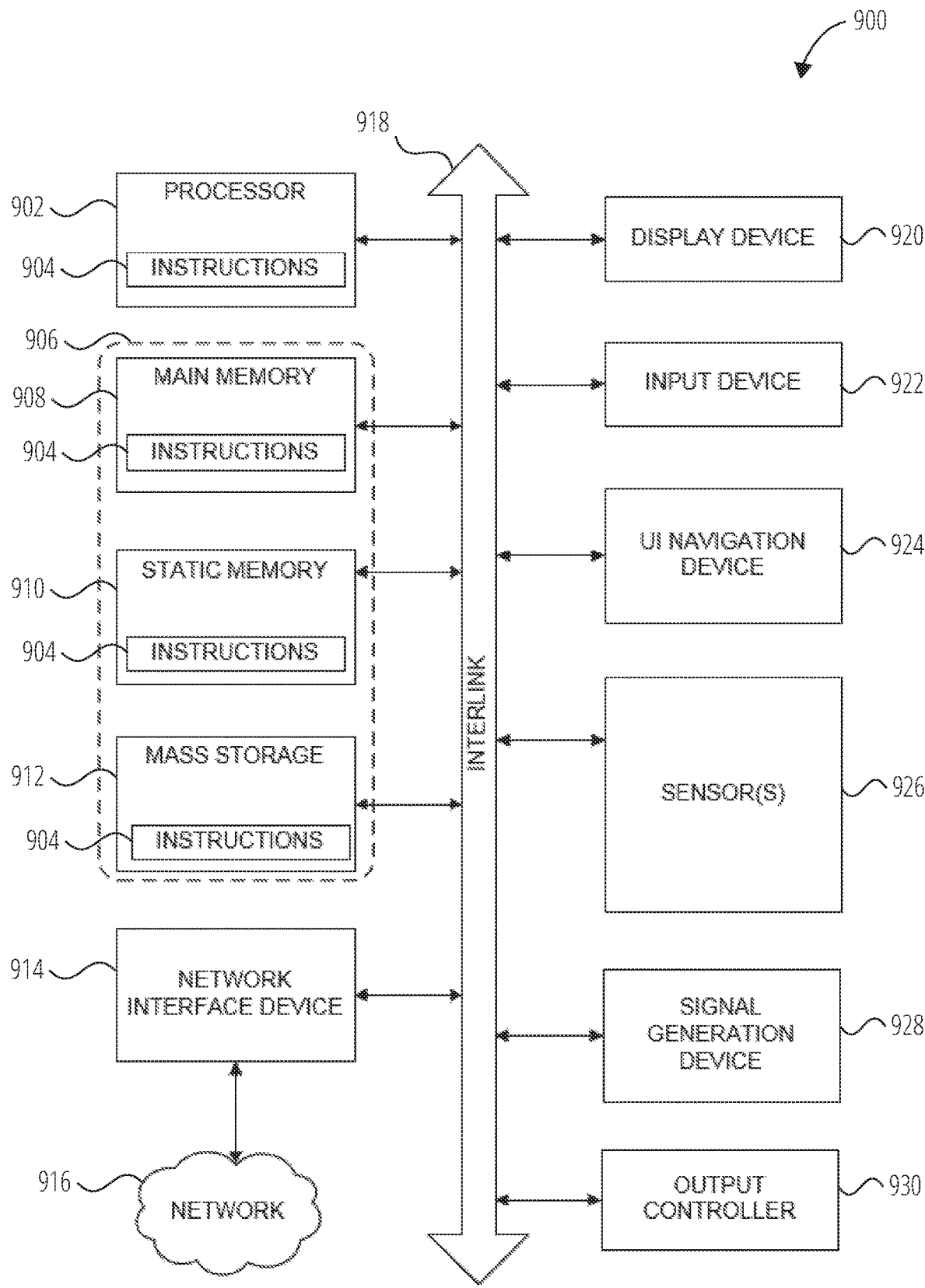
FIG. 9 illustrates an example of a machine with which, in which, or by which embodiments of the present disclosure can operate.

FIG. 9 illustrates a block diagram of an example machine 900 with which, in which, or by which any one or more of the techniques (e.g., methodologies) discussed herein can be implemented. Examples, as described herein, can include, or can operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 900 (e.g., computer system) can include a hardware processor 902 (e.g., a central processing unit (CPU), a graphics processing unit (GPU), a hardware processor core, or any combination thereof), a main memory 908, a static memory 910 (e.g., memory or storage for firmware, microcode, a basic-input-output (BIOS), unified extensible firmware interface (UEFI), etc.), and mass storage 912 (e.g., hard drives, tape drives, flash storage, or other block devices) some or all of which can communicate with each other via an interlink 918 (e.g., a bus, such as an SPI bus). The machine 900 can further include a display device 920, an alphanumeric input device 922 (e.g., a keyboard), and a user interface (UI) navigation device 924 (e.g., a mouse). In an example, the display device 920, input device 922, and navigation device 924 can be a touch screen display. The machine 900 can additionally include a mass storage 912 (e.g., drive unit), a signal generation device 928 (e.g., a speaker), a network interface device 914, and one or more sensor(s) 926, such as a global positioning system (GPS) sensor, compass, accelerometer, or other sensor. The machine 900 can include an output controller 930, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 908, the static memory 910, or the mass storage 912 can be, or include, a machine-readable medium 906 on which is stored one or more sets of data structures or instructions 904 (e.g., software) embodying or utilized by any one or more of the techniques or functions described herein. The instructions 904 can also reside, completely or at least partially, within any of registers of the processor 902, the main memory 908, the static memory 910, or the mass storage 912 during execution thereof by the machine 900. In an example, one or any combination of the hardware processor 902, the main memory 908, the static memory 910, or the mass storage 912 can constitute the machine-readable medium 906 or media. While the machine-readable medium 906 is illustrated as a single medium, the term "machine readable medium" can include a single medium or multiple media (e.g., a centralized or distributed database, or associated caches and servers) configured to store the one or more instructions 904. In an example, the various memory units or processor 902 can be communicatively coupled using a bus such as an SPI bus.

The term "machine readable medium" can include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable medium 906 can be representative of the instructions 904, such as instructions 904 themselves or a format from which the instructions 904 can be derived. This format from which the instructions 904 can be derived can include source code, encoded instructions (e.g., in compressed or encrypted form), packaged instructions (e.g., split into multiple packages), or the like. The information representative of the instructions 904 in the machine-readable medium 906 can be processed by processing circuitry into the instructions to implement any of the operations discussed herein. For example, deriving the instructions 904 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 904.

In an example, the derivation of the instructions 904 can include assembly, compilation, or interpretation of the information (e.g., by the processing circuitry) to create the instructions 904 from some intermediate or preprocessed format provided by the machine-readable medium 906. The information, when provided in multiple parts, can be combined, unpacked, and modified to create the instructions 904. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 904 can be further transmitted or received over a communication network 916 using a transmission medium via the network interface device 914 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®. IEEE 802.16 family of standards known as WiMax@), IEEE 802.15.4 family of standards, peer-to-peer (P2P) networks, among others. In an example, the network interface device 914 can include one or more physical jacks (e.g., Ethernet, coaxial, or phone jacks) or one or more antennas to connect to the communication network 916. In an example, the network interface device 914 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

The following are examples or devices and methods in accordance with the teachings herein. In an example, one or more of the following examples can be used with an SPI system to selectively enable or disable parity-protected communications or transactions between primary and second devices or chiplets in the system.

Example 1 can include a method such as can include or use conditional parity protection in communications between a primary chiplet and a secondary chiplet. The primary and secondary chiplets can be configured to communicate using a serial peripheral interface (SPI) interface using an SPI protocol. In Example 1, at the primary chiplet, the method can include querying a parity capability status register on the secondary chiplet and populating a primary parity control register using information received from the secondary chiplet, in response to the query, about a parity capability of the secondary chiplet. Example 1 can further include receiving a first message from the secondary chiplet and determining whether to check parity of one or more fields in the first message based on information from the primary parity control register about the parity capability of the secondary chiplet.

Example 2 can include or use the features of Example 1, and can further include, at the primary chiplet, preparing a data message for communication to the secondary chiplet, including preparing a message with at least one of a chiplet identification parity field, a register address parity field, and a data payload parity field.

Example 3 can include or use the features of Examples 1, and can further include, at the primary chiplet, preparing a data message for communication to the secondary chiplet, including preparing the data message with a chiplet identification parity field, a register address parity field, and a data payload parity field.

Example 4 can include or use the features of Examples 1-3, and can further include, at the primary chiplet, preparing a data message for communication to the secondary chiplet, wherein the data message includes at least one data parity bit for each of multiple different data fields in the data message when the primary parity control register indicates the secondary chiplet supports parity protection.

Example 5 can include or use the features of Examples 1-4, and can further include, at the primary chiplet, populating a parity enable control register at the secondary chiplet. Example 5 can include, at the secondary chiplet, enabling or disabling parity-protected communications with the primary chiplet based on contents of the parity enable control register.

Example 6 can include or use the features of Example 5, and can further include, at the secondary chiplet, using information in the parity enable control register to prepare a payload for communication to the primary chiplet.

Example 7 can include or use the features of Example 5 or Example 6, and can further include, at the secondary chiplet, receiving a transaction request from the primary chiplet, and when the parity enable control register indicates parity protection is enabled at the secondary chiplet, checking an odd parity of at least a portion of the transaction request from the primary chiplet.

Example 8 can include or use the features of Examples 1-7, and can further include, at the secondary chiplet, receiving a data message from the primary chiplet and, in response, preparing the first message with at least one of a secondary device status parity bit and a data payload parity bit.

Example 9 can include an apparatus comprising a primary chiplet couplable to multiple secondary chiplets using a serial peripheral interface (SPI) interface configured for an SPI protocol, wherein the primary chiplet comprises a primary parity control register. In Example 9, the primary chiplet can be configured to send respective first messages using the SPI interface to query a parity capability of the multiple secondary chiplets, and using responses to the first messages, populate the primary parity control register with information about a respective parity capability of the multiple secondary chiplets, and based on information in the primary parity control register, determine whether to check parity in respective messages received from the multiple secondary chiplets.

Example 10 can include or use the features of Example 9, wherein the primary chiplet is configured to use parity bits for multiple different fields in messages sent to the multiple secondary chiplets.

Example 11 can include or use the features of Examples 9 or 10, and can further include the multiple secondary chiplets, wherein each of the multiple secondary chiplets comprises a parity capability register that includes information about a parity-protected communication capability of the chiplet.

Example 12 can include or use the features of Example 11, wherein each of the multiple secondary chiplets comprises a parity enable register that is set via instruction from the primary chiplet.

Example 13 can include or use the features of Example 12, wherein the selected first chiplet can be configured to prepare a response message for communication to the primary chiplet, and wherein the response message includes at least one parity bit when the parity enable register of the selected first chiplet indicates parity-protected communications are enabled.

Example 14 can include or use the features of Examples 9-13, and can further include the selected first chiplet, wherein the selected first chiplet can be configured to prepare a response message that includes at least one parity bit for communication to the primary chiplet.

Example 15 can include or use the features of Example 14, wherein the response message can include a secondary device status parity bit and a data payload parity bit.

Example 16 can include a system comprising a primary chiplet coupled to multiple secondary chiplets using a serial peripheral interface (SPI) interface configured to use an SPI protocol, wherein the primary chiplet comprises a primary parity control register. The system in Example 16 can include, among other things, a first selected chiplet of the multiple secondary chiplets, the first selected chiplet configured to interface with the primary chiplet using the SPI interface, wherein the first selected chiplet comprises a parity capability register and a parity enable register. In Example 16, the primary chiplet can be configured to perform operations comprising, e.g., send a first message to query information from the parity capability register of the first selected chiplet, and using a first response to the first message, populate the primary parity control register with information about a parity capability of the first selected chiplet, and send a second message to populate the parity enable register of the first selected chiplet, wherein the second message includes instructions for the first selected chiplet to use or ignore a parity bit in transactions with the primary chiplet.

Example 17 can include or use the features of Example 16, wherein the primary chiplet is further configured to prepare a third message for communication to the first selected chiplet, the third message including at least one parity bit when information in the primary parity control register for the selected first chiplet indicates the selected first chiplet is configured to use parity-protected communication.

Example 18 can include or use the features of Examples 16 or 17, and can further include a second selected chiplet of the multiple secondary chiplets, wherein the second selected chiplet comprises a parity enable register with information that indicates the second selected chiplet is not configured for parity-protected communications with the primary chiplet, and the parity enable register of the first selected chiplet includes information that indicates the first selected chiplet is configured for parity-protected communications with the primary chiplet.

Example 19 can include or use the features of Examples 16-18, wherein the primary chiplet is configured to use information from the primary parity control register about the first selected chiplet to determine whether a response message received from the first selected chiplet includes or uses a parity bit.

Example 20 can include or use the features of Examples 16-19, wherein the primary chiplet and the first selected chiplet are each configured to use parity-protected data messages when the parity capability register of the first selected chiplet indicates that the first selected chiplet supports parity-protected communications.

Each of the above Examples can be combined or used together in various ways to carry out communications over a synchronous interface, such as over an SPI interface.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:
   using conditional parity protection in communications between a primary chiplet and a secondary chiplet, wherein the primary and secondary chiplets are configured to communicate using a serial peripheral interface (SPI) interface using an SPI protocol, including:
   at the primary chiplet:
      querying a parity capability status register on the secondary chiplet;
      populating a primary parity control register using information received from the secondary chiplet, in response to the query, about a parity capability of the secondary chiplet;
      receiving a first message from the secondary chiplet; and
      determining whether to check parity of one or more fields in the first message based on information from the primary parity control register about the parity capability of the secondary chiplet.

2. The method of claim 1, further comprising, at the primary chiplet, preparing a data message for communication to the secondary chiplet, including preparing a message with at least one of a chiplet identification parity field, a register address parity field, and a data payload parity field.

3. The method of claim 1, further comprising, at the primary chiplet, preparing a data message for communication to the secondary chiplet, including preparing the data message with a chiplet identification parity field, a register address parity field, and a data payload parity field.

4. The method of claim 1, further comprising, at the primary chiplet, preparing a data message for communication to the secondary chiplet, wherein the data message includes at least one data parity bit for each of multiple different data fields in the data message when the primary parity control register indicates the secondary chiplet supports parity protection.

5. The method of claim 1, further comprising:
   at the primary chiplet, populating a parity enable control register at the secondary chiplet; and
   at the secondary chiplet, enabling or disabling parity-protected communications with the primary chiplet based on contents of the parity enable control register.

6. The method of claim 5, further comprising, at the secondary chiplet, using information in the parity enable control register to prepare a payload for communication to the primary chiplet.

7. The method of claim 5, further comprising, at the secondary chiplet:
   receiving a transaction request from the primary chiplet; and
   when the parity enable control register indicates parity protection is enabled at the secondary chiplet, checking an odd parity of at least a portion of the transaction request from the primary chiplet.

8. The method of claim 1, further comprising, at the secondary chiplet:
   receiving a data message from the primary chiplet and, in response, preparing the first message with at least one of a secondary device status parity bit and a data payload parity bit.

9. An apparatus comprising:
   a primary chiplet couplable to multiple secondary chiplets using a serial peripheral interface (SPI) interface configured for an SPI protocol, wherein the primary chiplet comprises a primary parity control register, and wherein the primary chiplet is configured to:
- send respective first messages using the SPI interface to query a parity capability of the multiple secondary chiplets;
- using responses to the first messages, populate the primary parity control register with information about a respective parity capability of the multiple secondary chiplets; and
- based on information in the primary parity control register, determine whether to check parity in respective messages received from the multiple secondary chiplets.

10. The apparatus of claim 9, wherein the primary chiplet is configured to use parity bits for multiple different fields in messages sent to the multiple secondary chiplets.

11. The apparatus of claim 9, further comprising the multiple secondary chiplets:
wherein each of the multiple secondary chiplets comprises a parity capability register that includes information about a parity-protected communication capability of the chiplet.

12. The apparatus of claim 11, wherein each of the multiple secondary chiplets comprises a parity enable register that is set via instruction from the primary chiplet.

13. The apparatus of claim 12, wherein the selected first chiplet is configured to prepare a response message for communication to the primary chiplet, wherein the response message includes at least one parity bit when the parity enable register of the selected first chiplet indicates parity-protected communications are enabled.

14. The apparatus of claim 9, further comprising the selected first chiplet, wherein the selected first chiplet is configured to prepare a response message that includes at least one parity bit for communication to the primary chiplet.

15. The apparatus of claim 14, wherein the response message includes a secondary device status parity bit and a data payload parity bit.

16. A system comprising:
- a primary chiplet coupled to multiple secondary chiplets using a serial peripheral interface (SPI) interface configured to use an SPI protocol, wherein the primary chiplet comprises a primary parity control register; and
- a first selected chiplet of the multiple secondary chiplets, the first selected chiplet configured to interface with the primary chiplet using the SPI interface, wherein the first selected chiplet comprises a parity capability register and a parity enable register;

wherein the primary chiplet is configured to perform operations comprising:
- send a first message to query information from the parity capability register of the first selected chiplet;
- using a first response to the first message, populate the primary parity control register with information about a parity capability of the first selected chiplet; and
- send a second message to populate the parity enable register of the first selected chiplet, wherein the second message includes instructions for the first selected chiplet to use or ignore a parity bit in transactions with the primary chiplet.

17. The system of claim 16, wherein the primary chiplet is further configured to prepare a third message for communication to the first selected chiplet, the third message including at least one parity bit when information in the primary parity control register for the selected first chiplet indicates the selected first chiplet is configured to use parity-protected communication.

18. The system of claim 16, further comprising a second selected chiplet of the multiple secondary chiplets, wherein the second selected chiplet comprises a parity enable register with information that indicates the second selected chiplet is not configured for parity-protected communications with the primary chiplet, and wherein the parity enable register of the first selected chiplet includes information that indicates the first selected chiplet is configured for parity-protected communications with the primary chiplet.

19. The system of claim 16, wherein the primary chiplet is configured to use information from the primary parity control register about the first selected chiplet to determine whether a response message received from the first selected chiplet includes or uses a parity bit.

20. The system of claim 16, wherein the primary chiplet and the first selected chiplet are each configured to use parity-protected data messages when the parity capability register of the first selected chiplet indicates that the first selected chiplet supports parity-protected communications.

* * * * *